(12) United States Patent
Hart

(10) Patent No.: US 9,689,470 B2
(45) Date of Patent: Jun. 27, 2017

(54) MULTI-SPEED TRANSMISSION

(71) Applicant: GM Global Technology Operations LLC, Detroit, MI (US)

(72) Inventor: James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 76 days.

(21) Appl. No.: 14/640,761

(22) Filed: Mar. 6, 2015

(65) Prior Publication Data

US 2015/0267785 A1 Sep. 24, 2015

Related U.S. Application Data

(60) Provisional application No. 61/968,936, filed on Mar. 21, 2014.

(51) Int. Cl.
| | |
|---|---|
| *F16H 3/62* | (2006.01) |
| *F16H 3/44* | (2006.01) |
| *F16H 37/06* | (2006.01) |
| *F16H 3/66* | (2006.01) |

(52) U.S. Cl.
CPC .............. *F16H 3/663* (2013.01); *F16H 3/66* (2013.01); *F16H 2003/442* (2013.01); *F16H 2200/0073* (2013.01); *F16H 2200/0086* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC ................... F16H 2200/201; F16H 2200/2046
See application file for complete search history.

(56) References Cited

U.S. PATENT DOCUMENTS

| | | | | |
|---|---|---|---|---|
| 5,049,116 | A * | 9/1991 | Asada | F16H 3/663 |
| | | | | 475/269 |
| 8,197,375 | B1 | 6/2012 | Hart | |
| 8,277,355 | B2 * | 10/2012 | Hart | F16H 3/666 |
| | | | | 475/277 |
| 8,343,005 | B2 * | 1/2013 | Hart | F16H 3/66 |
| | | | | 475/276 |
| 8,343,007 | B2 * | 1/2013 | Hart | F16H 3/66 |
| | | | | 475/288 |
| 8,353,801 | B2 | 1/2013 | Hart | |
| 8,523,729 | B2 | 9/2013 | Hart | |
| 8,715,130 | B2 * | 5/2014 | Mellet | F16H 3/62 |
| | | | | 475/277 |
| 8,758,185 | B2 | 6/2014 | Mellet | |
| 8,894,534 | B2 | 11/2014 | Mellet | |
| 9,074,663 | B2 * | 7/2015 | Mellet | F16H 3/66 |
| 9,347,530 | B2 * | 5/2016 | Hart | F16H 3/663 |
| 2010/0184553 | A1 * | 7/2010 | Wittkopp | F16H 3/66 |
| | | | | 475/275 |
| 2014/0357434 | A1 | 12/2014 | Lundberg | |

FOREIGN PATENT DOCUMENTS

| | | |
|---|---|---|
| CN | 102434638 A | 5/2012 |
| CN | 102434639 A | 5/2012 |
| CN | 103244617 A | 8/2013 |

\* cited by examiner

*Primary Examiner* — Tisha Lewis

(57) ABSTRACT

A transmission is provided having an input member, an output member, at least three planetary gear sets, a plurality of coupling members and a plurality of torque transmitting devices. The torque transmitting devices include clutches and brakes actuatable in combinations of three to establish a plurality of forward gear ratios and at least one reverse gear ratio.

46 Claims, 6 Drawing Sheets

| GEAR STATE | GEAR RATIO | RATIO STEP | 22 | 24 | 26 | 28 | 30 | 32 |
|---|---|---|---|---|---|---|---|---|
| REV2 | -1.925 |  | X |  | X |  |  | X |
| REV1 | -3.229 | 1.68 | X | X |  |  |  | X |
| N |  | -1.73 |  |  |  |  |  |  |
| 1st | 5.579 |  | X |  |  | X |  | X |
| 1st | 5.579 |  | X |  |  | X | X |  |
| 1st | 5.579 |  | X | X |  | X |  |  |
| 1st | 5.579 |  | X |  | X | X |  |  |
| 2nd | 4.397 | 1.27 | X |  |  | X | X |  |
| 3rd | 3.094 | 1.42 | X | X |  |  | X |  |
| 4th | 2.330 | 1.33 |  | X | X | X |  |  |
| 5th | 1.837 | 1.27 |  | X | X |  | X |  |
| 6th | 1.525 | 1.20 |  | X |  | X | X |  |
| 7th | 1.322 | 1.15 |  | X |  |  | X | X |
| 8th | 1.161 | 1.14 |  | X |  | X |  | X |
| 9th | 1.000 | 1.16 |  |  |  | X | X | X |
| 10th | 0.867 | 1.15 |  |  | X | X |  | X |
| 11th | 0.788 | 1.10 |  |  | X |  | X | X |
| OVERALL RATIO |  | 7.08 |  |  |  |  |  |  |

Fig-3

MULTI-SPEED TRANSMISSION

CROSS-REFERENCE TO RELATED APPLICATIONS

This application claims priority to U.S. Provisional Application No. 61/968,936, filed on Mar. 21, 2014, which is hereby incorporated in its entirety herein by reference.

FIELD

The invention relates generally to a multiple speed transmission, and more particularly, to a transmission having a plurality speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, a first, second, and third planetary gear sets, two interconnecting members, and six torque transmitting mechanisms. Each of the planetary gear sets have at least a first, second, and third members. The first planetary gear set further includes a fourth member. The two interconnecting members continuously interconnect a member of the first, second, and third planetary gear sets with another member of the first, second, and third planetary gear sets. The six torque transmitting mechanisms are each selectively engageable to interconnect a member of the first, second, and third planetary gear sets with another member of the first, second, and third planetary gear sets or a stationary member. The six torque transmitting mechanisms are selectively engageable in combinations of at least three to establish a plurality of forward speed ratios and at least one reverse speed ratio between the input member and the output member.

In one example of the present invention, a first of the two interconnecting members continuously interconnects the fourth member of the first planetary gear set with the second member of the second planetary gear set.

In another example of the present invention, a second of the two interconnecting members continuously interconnects the first member of the second planetary gear set with the third member of the third planetary gear set.

In yet another example of the present invention, a first of the six torque transmitting mechanisms is selectively engageable to interconnect the first member of the first planetary gear set with the first member of the third planetary gear set.

In yet another example of the present invention, a second of the six torque transmitting mechanisms is selectively engageable to interconnect the first member of the first planetary gear set with the second member of the third planetary gear set.

In yet another example of the present invention, a third of the six torque transmitting mechanisms is selectively engageable to interconnect the fourth member of the first planetary gear set with the first member of the third planetary gear set.

In yet another example of the present invention, a fourth of the six torque transmitting mechanisms is selectively engageable to interconnect the third member of the first planetary gear set with the stationary member.

In yet another example of the present invention, a fifth of the six torque transmitting mechanisms is selectively engageable to interconnect the third member of the second planetary gear set with the stationary member.

In yet another example of the present invention, a sixth of the six torque transmitting mechanisms is selectively engageable to interconnect the third member of the third planetary gear set with the stationary member.

In yet another example of the present invention, the input member is continuously connected for common rotation with the second member of the third planetary gear set.

In yet another example of the present invention, the output member is continuously connected for common rotation with the second member of the first planetary gear set.

In yet another example of the present invention, the first member of the first planetary gear set, the first member of the second planetary gear set, and the third member of the third planetary gear set are first sun gears, the third member of the second planetary gear set and the first member of the third planetary gear set are ring gears, and the second member of the second planetary gear set and the second member of the third planetary gear set are planet carriers.

In yet another example of the present invention, the second member of the first planetary gear set is a ring gear, the third member of the first planetary gear set is a planet carrier, and the fourth member of the first planetary gear set is a combined sun/ring gear.

In yet another example of the present invention, the second and third members of the first planetary gear set include a ring gear combined with a planet carrier and the fourth member of the first planetary gear set is a second sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the second sun gear, the ring gear, and the second set of pinions, and the second set of pinions are short pinions meshing with the first set of pinions and the first sun gear.

In yet another example of the present invention, the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the second sun gear, the small diameter portion meshing with the ring gear and the second set of pinions, and the second set of pinions are short pinions and mesh with the small diameter portion of the first set of pinions and the first sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, the second set of pinions, and the ring gear, the second set of pinions are long pinions meshing with the first set of pinions and the first sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, and the second set of pinions, and the second set of pinions are long pinions meshing with the first set of pinions, the first sun gear, and the ring gear.

In yet another example of the present invention, the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the first sun gear, the small diameter portion meshing with the ring gear and the second set of pinions, and the second set of pinions are short pinions meshing with the small diameter portion of the first set of pinions and the second sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the first sun gear, the ring gear, and the second set of pinions, and the second set of pinions are long pinions meshing with the first set of pinions and the second sun gear.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting an example of a state of engagement of various torque transmitting elements to produce multiple forward and at least one reverse speed or gear ratios of the transmissions illustrated in FIGS. 1 and 2;

DETAILED DESCRIPTION

The following description is merely exemplary in nature and is not intended to limit the present disclosure, application, or uses.

Figure 1:
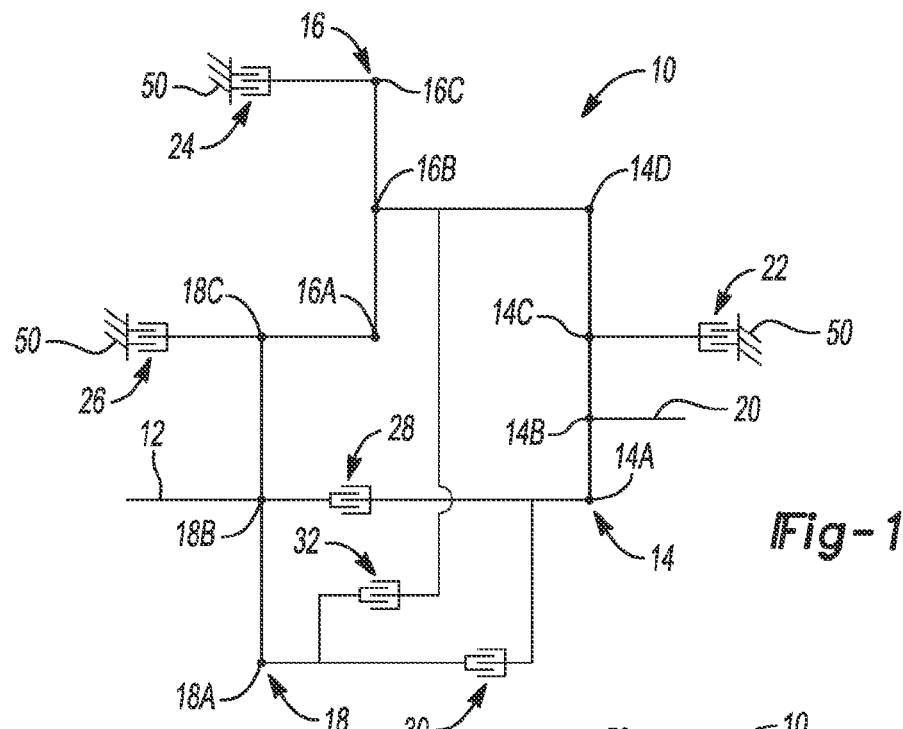
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. Alternatively, a lever represents a planetary gear set assembly wherein a node represents one of four things: one of the three basic mechanical components of the planetary gear set, a coupling of one of the three basic mechanical components of a first planetary gear set and one of the three basic mechanical components of a second planetary gear set, one of the four basic mechanical components of a stacked planetary gear set, or one of the four basic mechanical components of a Ravineaux gear set. Therefore, a single lever of this type contains four nodes. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, and a third planetary gear set 18, and an output shaft or member 20. In the lever diagram of FIG. 1, the first planetary gear set 14 has four nodes: a first node 14A, a second node 14B, a third node 14C, and a fourth node 14D. The second planetary gear set 16 has three nodes: a first node 16A, a second node 16B and a third node 16C. The third planetary gear set 18 has three nodes: a first node 18A, a second node 18B and a third node 18C. The input member 12 is continuously coupled to the second node 14B of the first planetary gear set 14. The output member 20 is continuously coupled to the second node 18B of the third planetary gear set 18.

The fourth node 14D of the first planetary gear set 14 is coupled to the second node 16B of the second planetary gear set 16. The first node 16A of the second planetary gear set 16 is coupled the third node 18C of the third planetary gear set 18.

A first clutch 22 selectively connects the third node 14C of the first planetary gear set 14 with a stationary member 50. A second clutch 24 selectively connects the third node 16C of the second planetary gear set 16 with the stationary member 50. A third clutch 26 selectively connects the third node 18C of the third planetary gear set 18 with the stationary member 50. A fourth clutch 28 selectively connects the first node 14A of the first planetary gear set 14 with the second node 18B of the third planetary gear set 18. A fifth clutch 30 selectively connects the first node 14A of the first planetary gear set 14 with the first node 18A of the third planetary gear set 18. A sixth clutch 32 selectively connects the fourth node 14D of the first planetary gear set 14 and the second node 16B of the second planetary gear set 16 with the first node 18A of the third planetary gear set 18.

Figure 2:
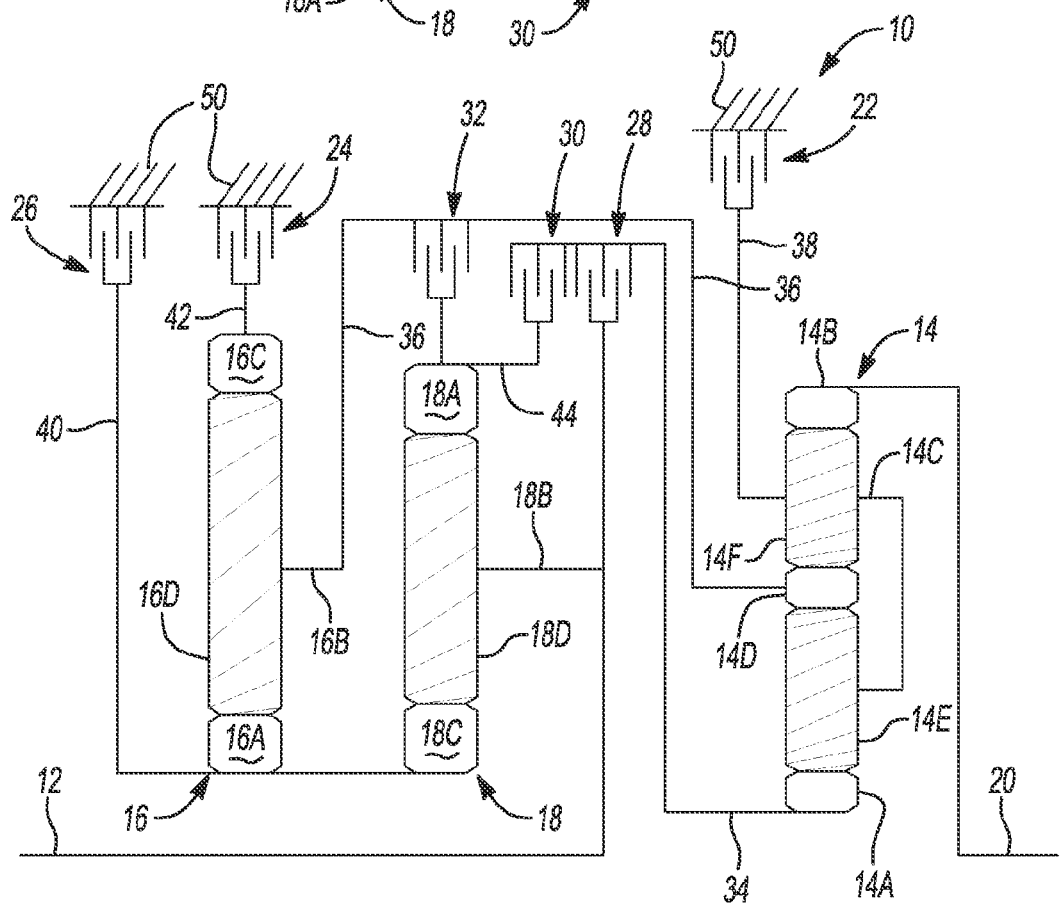
FIG. 2 is a diagrammatic illustration of a variation of the transmission of FIG. 1 according to the principles of the present invention.

Referring now to FIG. 2, a stick diagram presents a schematic layout of an embodiment of the mufti-speed transmission 10 according to one form of the present invention. In FIG. 2, the numbering from the lever diagram of FIG. 1 is carried over where appropriate. The clutches and couplings are correspondingly presented whereas the nodes of the planetary gear sets now appear as components of planetary gear sets or planetary gear set assemblies such as sun gears, ring gears, planet gears, planet gear carriers, and other rotating members.

For example, a first planetary gear set assembly 14 is a stacked planetary gear set 14 that includes a sun gear member 14A, a planet gear carrier 14C, a sun/ring common gear member 14D, and a ring gear member 114B. The planet gear carrier 14C rotatably supports a first and a second set of planet gears 14E, 14F (only one of each set is shown). The sun/ring common gear member 14D is an annular shaped gear having a plurality of gear teeth on both the inner periphery and the outer periphery of the gear. The sun gear member 14A is connected for common rotation with a first shaft or interconnecting member 34. The sun/ring common gear member 14D is connected for common rotation with a second shaft or interconnecting member 36. The planet gear carrier 14C is connected for common rotation with a third shaft or interconnecting member 38. The ring gear member 14B is connected for common rotation with the output shaft or member 20. The set of planet gears 14E are each configured to intermesh with both the sun gear member 14A and the sun/ring common gear member 14D. The set of planet gears 14F are each configured to intermesh with both the sun/ring common gear member 14D and the ring gear member 14B.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44, the members of the planetary gear set assemblies 14, 16, 18, or the stationary member or transmission housing 50.

For example, the first brake 22 is selectively engageable to connect the third shaft or interconnecting member 38 to the transmission housing 50 in order to restrict the planet gear carrier 14C from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Referring now to FIGS. 1, 2 and 3, the operation of the multi-speed transmission 10 will be described. It will be appreciated that transmission 10 is capable of transmitting torque from the input shaft or member 12 to the output haft or member 20 in multiple forward speed torque ratios and at least one reverse speed or torque ratio. Each forward and reverse speed or torque ratio is attained by engagement of one or more of the torque-transmitting mechanisms (Le, first brake 22, second brake 24, first clutch 26, second clutch 28, third clutch 30, and fourth clutch 32), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, a reverse gear is established by engaging or activating the first brake 22 third brake 26, and the third clutch 32. The first brake 22 connects the third shaft or interconnecting member 38, and therefore the planet gear carrier 14C of the first planetary gear set assembly 14, to the transmission housing 50 in order to restrict the planet gear carrier 14C of the first planetary gear set assembly 14 from rotating relative to the transmission housing 50. The third brake 26 connects the fourth shaft or interconnecting member 40, and therefore the ring gear 16A of the second planetary gear set assembly 16, to the transmission housing in order to restrict the ring gear 16A of the second planetary gear set assembly 16 from rotating relative to the transmission housing 50. The fourth clutch 32 connects the second shaft or interconnecting member 36, and therefore the sun/ring common gear member 14D of the first planetary gear set assembly 14 with the sixth shaft or interconnecting member 44. Likewise, the eleven forward ratios and two reverse ratios are achieved through different combinations of clutch and brake engagement, as shown in FIG. 3, by way of example. Moreover, FIG. 3 shows four different clutch and brake engagement combinations contemplated by the present invention for achieving a first gear.

Figure 4:
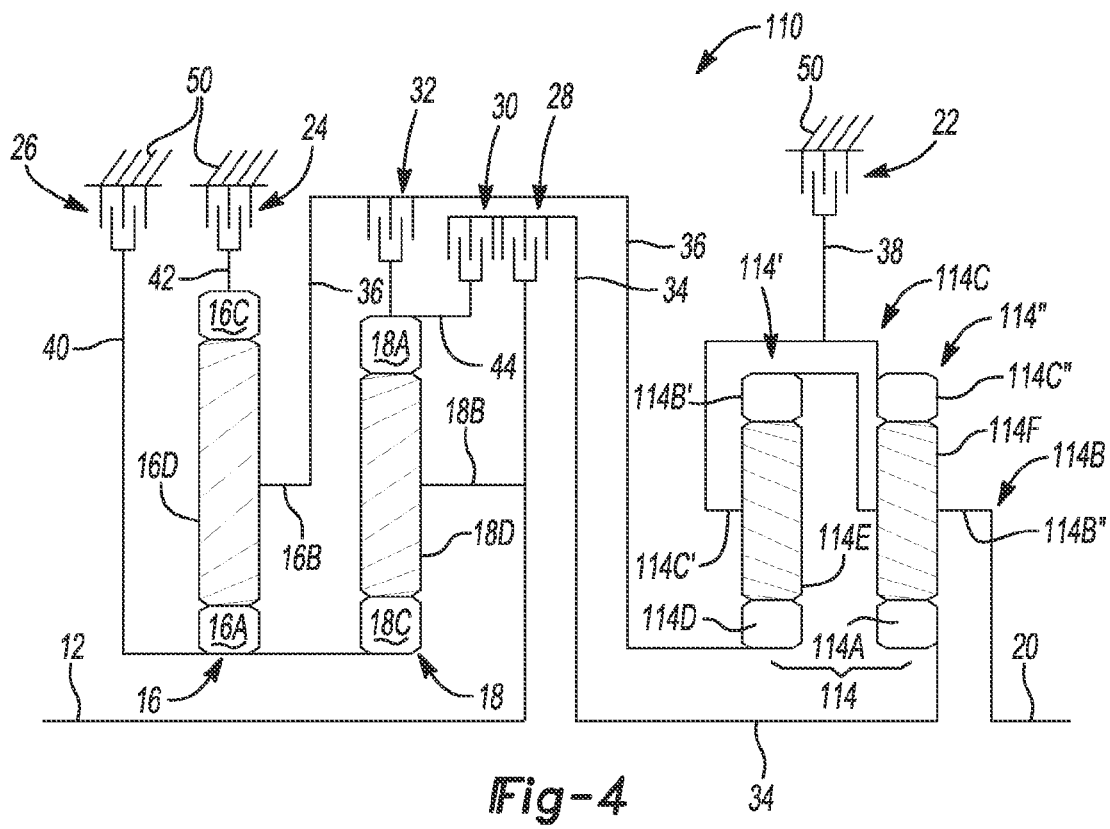
FIG. 4 is a diagrammatic illustration of a variation of the transmission of FIG. 1 according to the principles of the present invention.

Referring now to FIG. 4, a stick diagram presents a schematic layout of another embodiment of the multi-speed transmission 110 according to one form of the present invention. In FIG. 2, the numbering from the lever diagram of FIG. 1 is carried over where appropriate. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 114 includes first planetary gear set 114' and a second planetary gear set 114". The first planetary gear set 114' includes a sun gear member 114D, a planet gear carrier 114C', and a ring gear member 114B'. The planet gear carrier 114C' rotatably supports a set of planet gears 114E (only one of which is shown). The sun gear member 114D is connected for common rotation with a second shaft or interconnecting member 36. The planet gear carrier 114C' is connected for common rotation with a third shaft or interconnecting member 38. The ring gear member 114B' is connected for common rotation with the output shaft or member 20. The set of planet gears 114E are each configured to intermesh with both the sun gear member 114D and the ring gear member 114B'.

The second planetary gear set 114" includes a sun gear member 114A, a planet gear carrier 114B", and a ring gear member 114C". The planet gear carrier 114B" rotatably supports a set of planet gears 114F (only one of which is shown). The sun gear member 114A is connected for common rotation with a first shaft or interconnecting member 34. The planet gear carrier 114B" is connected for common rotation with the output shaft or member 20 and thus combines with the ring gear member 114B' of the first planetary gear set 114' to form a first common rotating member 114E of the first planetary gear set assembly 114. The ring gear member 114C" is connected for common rotation with the third shaft or interconnecting member 38 and thus combines with the planet gear carrier 114C' of the first planetary gear set 114' to form a second common rotating member 114C of the first planetary gear set assembly 114. The set of planet gears 114F are each configured to intermesh with both the sun gear member 114A and the ring gear member 114C".

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44, the members of the planetary gear set assemblies 114, 16, 18, or the stationary member or transmission housing 50.

For example, the first brake 22 is selectively engageable to connect the third shaft or interconnecting member 38 to the transmission housing 50 in order to restrict the second common rotating member 114C from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 5:
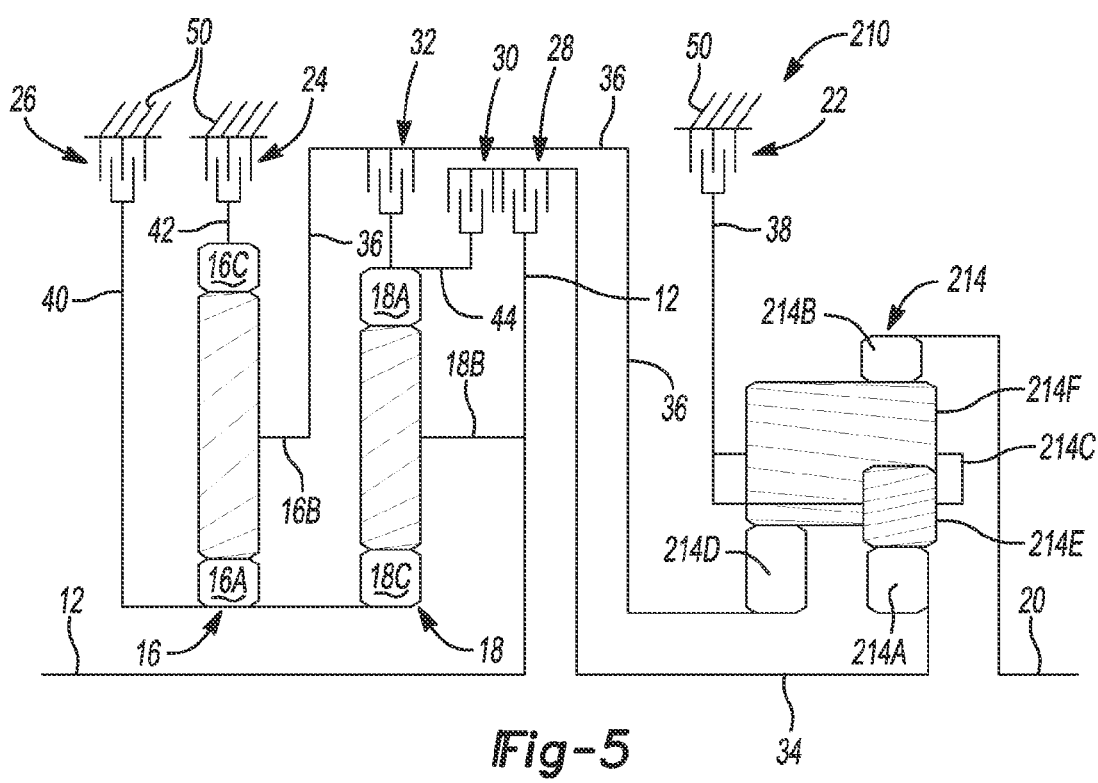
FIG. 5 is a diagrammatic illustration of a variation of the transmission of FIG. 1 according to the principles of the present invention.

Referring now to FIG. 5, a stick diagram presents a schematic layout of another embodiment of the multi-speed transmission 210 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 214 is a Ravigneaux gear set 214 that has a first sun gear member 214A, a ring gear member 214B, a second sun gear member 214D, and a planet gear carrier 214C. The planet gear carrier 214C rotatably supports a first and a second set of planet gears 214E, 214F (only one of each set is shown). The first sun gear member 214A is connected for common rotation with a first shaft or interconnecting member 34. The second sun gear member 214D is connected for common rotation with a second shaft or interconnecting member 36. The planet gear carrier 214C is connected for common rotation with a third shaft or interconnecting member 38. The ring gear member 214B is connected for common rotation with the output shaft or member 20. The first set of planet gears 214E is a set of short planets configured to intermesh with the first sun gear member 214A and the second set of planet gears 214F. The second set of planet gears 214F is a set of long planet gears that are each configured to intermesh with each of the second sun gear member 214A, the ring gear member 214B, and the first set of planet gears 214E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the planet carrier member 214C from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 6:
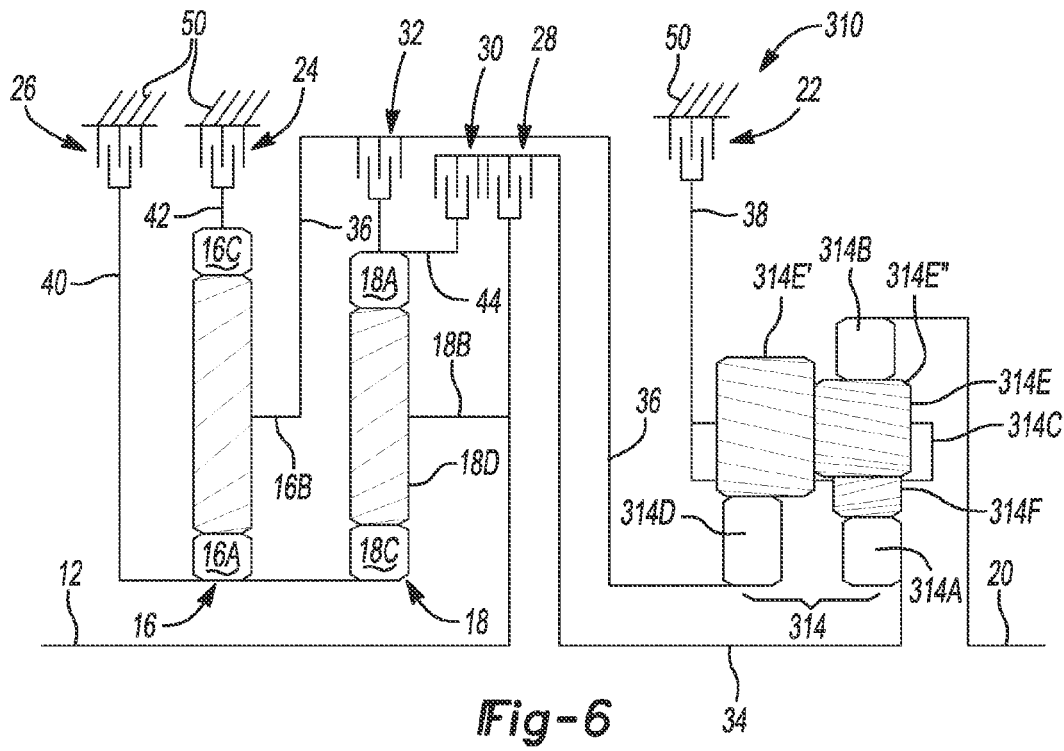
FIG. 6 is a diagrammatic illustration of a variation of the transmission of FIG. 1 according to the principles of the present invention.

Referring now to FIG. 6, a stick diagram presents a schematic layout of another embodiment of the multi-speed transmission 310 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 314 is a Ravigneaux gear set 314 that has a first sun gear member 314A, a ring gear member 314B, a second sun gear member 314D, and a planet gear carrier 314C. The planet gear carrier 314B rotatably supports a first and a second set of planet gears 314E, 314F (only one of each set is shown). The sun gear member 314A is connected for common rotation with a first shaft or interconnecting member 34. The second sun gear member 314D is connected for common rotation with a second shaft or interconnecting member 36. The planer gear carrier 314C is connected for common rotation with a third shaft or interconnecting member 38. The ring gear member 314B is connected for common rotation with the output shaft or member 20. The first set of planet gears 314E is a set of stepped long planets each having a first diameter 314E' configured to intermesh with the second sun gear member 314D and a second diameter 314E" configured to intermesh with the second set of planet gears 314F, and the ring gear member 314B. The second set of planet gears 314F is a set of short planet gears that are each configured to intermesh with both the first sun gear member 314A and the second diameter 314E" of the first set of planet gears 314E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the planet carrier member 314C from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 7:
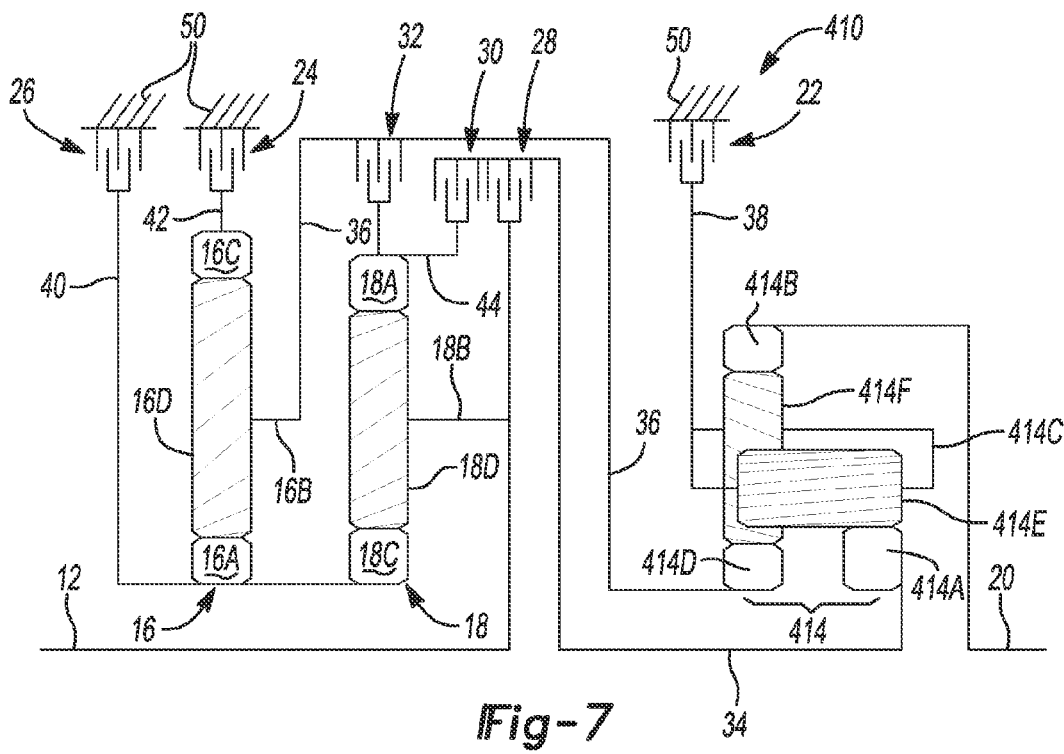
FIG. 7 is a diagrammatic illustration of a variation of the transmission of FIG. 1 according to the principles of the present invention.

Referring now to FIG. 7, a stick diagram presents a schematic layout of another embodiment of the multi-speed transmission 410 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 414 is a Ravigneaux gear set 414 that has a first sun gear member 414A, a ring gear member 414B, a second sun gear member 414D, and a planet gear carrier 414C. The planet gear carrier 414C rotatably supports a first and a second set of planet gears 414E, 414F (only one of each set is shown). The first sun gear member 414A is connected for common rotation with a first shaft or interconnecting member 34. The second sun gear member 414D is connected for common rotation with a second shaft or interconnecting member 36. The planet gear carrier 414C is connected for common rotation with a third shaft or interconnecting member 38. The ring gear member 414B is connected for common rotation with the output shaft or member 20. The first set of planet gears 414E is a set of long planets configured to intermesh with the first sun gear member 414A and the second set of planet gears 414F. The second set of planet gears 414F is a set of short planet gears that are each configured to intermesh with each of the second sun gear member 414D, the ring gear member 414B, and the first set of planet gears 414E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the planet carrier member 414C from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 8:
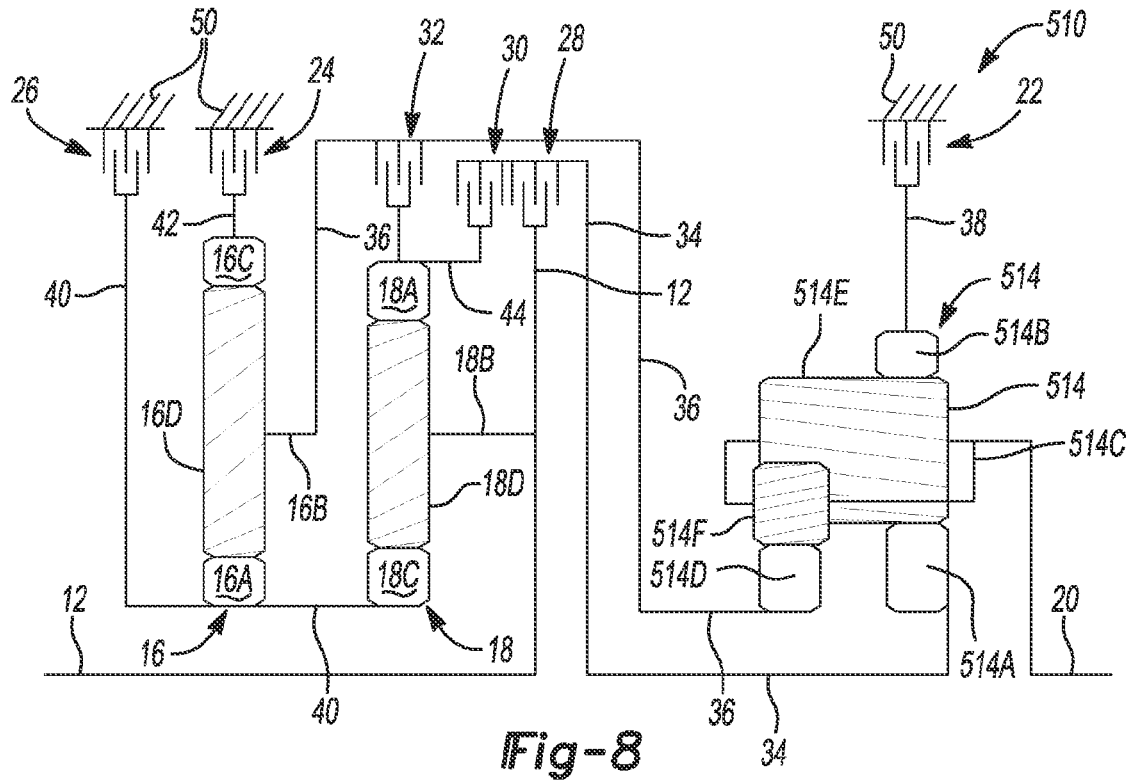
FIG. 8 is a diagrammatic illustration of a variation of the transmission of FIG. 1 according to the principles of the present invention.

Referring now to FIG. 8, a stick diagram presents a schematic layout of another embodiment of the multi-speed transmission 510 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 514 is a Ravigneaux gear set 514 that has a first sun gear member 514A, a ring gear member 514B, a second sun gear member 514D, and a planet gear carrier 514C. The planet gear carrier 514C rotatably supports a first and a second set of planet gears 514E, 514F (only one of each set is shown). The first sun gear member 514A is connected for common rotation with a first shaft or interconnecting member 34. The second sun gear member 514D is connected for common rotation with a second shaft or interconnecting member 36. The ring gear member 514B is connected for common rotation with a third shaft or interconnecting member 38. The planet gear carrier 514C is connected for common rotation with the output shaft or member 20. The first set of planet gears 514E is a set of long planets configured to intermesh with each of the first sun gear member 514A, the ring gear member 514B, and the second set of planet gears 514F. The second set of planet gears 514F is a set of short planet gears that are each configured to intermesh with each of the second sun gear member 514D and the first set of planet gears 514E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear member 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the ring gear member 514B from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 9:
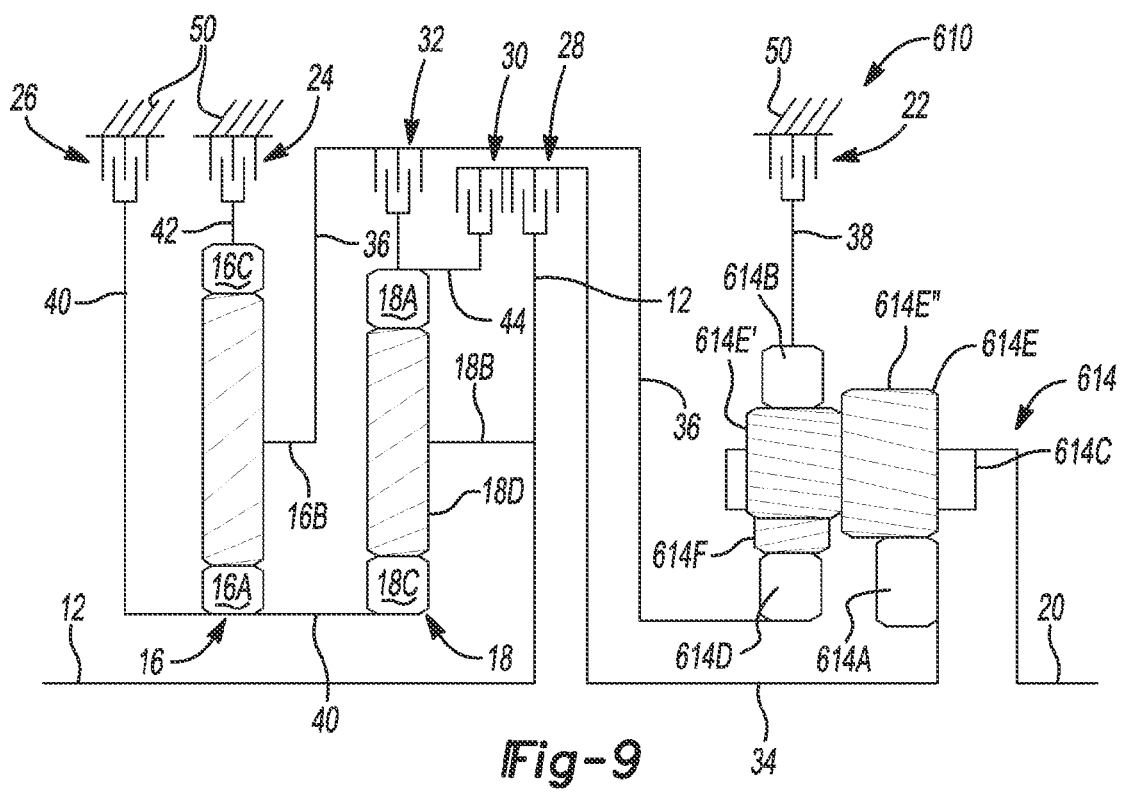
FIG. 9 is a diagrammatic illustration of a variation of the transmission of FIG. 1 according to the principles of the present invention.

Referring now to FIG. 9, a stick diagram presents a schematic layout of another embodiment of the multi-speed transmission 410 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 614 is a Ravigneaux gear set 614 that has a first sun gear member 614A, a ring gear member 614B, a second sun gear member 614D, and a planet gear carrier 614C. The planet gear carrier 614C rotatably supports a first and a second set of planet gears 614E, 614F (only one of each set is shown). The first sun gear member 614A is connected for common rotation with a first shaft or interconnecting member 34. The second sun gear member 614D is connected for common rotation with a second shaft or interconnecting member 36. The ring gear member 614B is connected for common rotation with a third shaft or interconnecting member 38. The planet gear carrier 614C is connected for common rotation with the output shaft or member 20. The first set of planet gears 614E is a set of stepped long planets each having a first diameter 614E' configured to intermesh with each of the ring gear member 614B and the second set of planet gears 614F and a second diameter 614E" configured to intermesh with the first sun gear member 614A. The second set of planet gears 614F is a set of short planet gears that are each configured to intermesh with both the second sun gear member 614D and the first diameter 614E' of the first set of planet gears 614E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear ember 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (nor shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the ring gear member 614B from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

Figure 10:
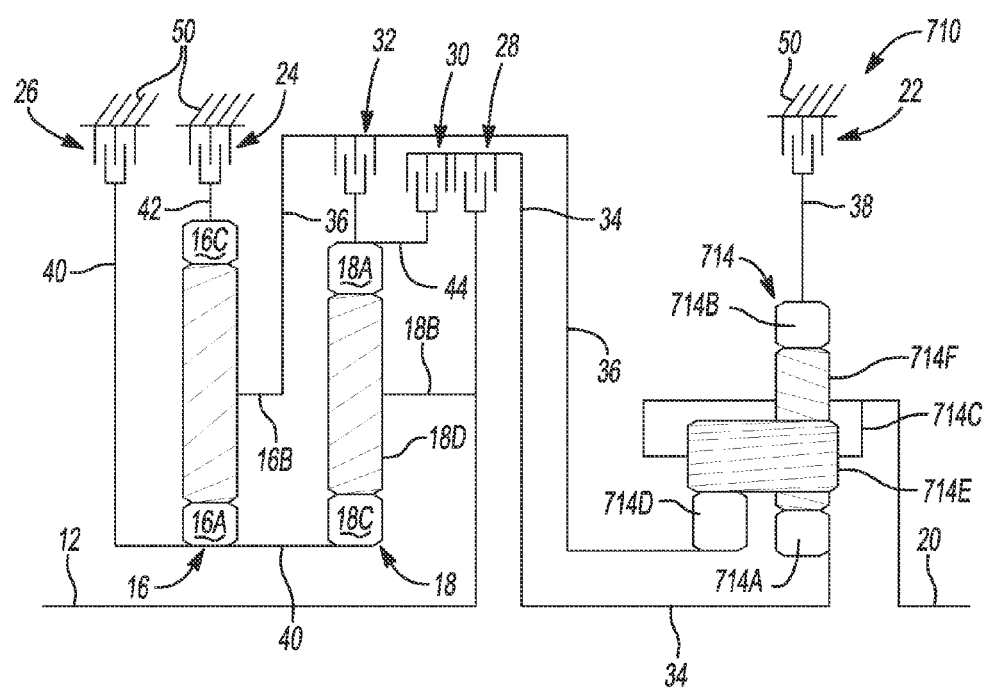
FIG. 10 is a diagrammatic illustration of a variation of the transmission of FIG. 1 according to the principles of the present invention.

Referring now to FIG. 10, a stick diagram presents a schematic layout of another embodiment of the multi-speed transmission 410 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 714 is a Ravigneaux gear set 714 that has a first sun gear member 714A, a ring gear member 714B, a second sun gear member 714D, and a planet gear carrier 714C. The planet gear carrier 714C rotatably supports a first and a second set of planet gears 714E, 714F (only one of each set is shown). The first sun gear member 714A is connected for common rotation with a first shaft or interconnecting member 34. The second sun gear member 714D is connected for common rotation with a second shaft or interconnecting member 36. The ring gear member 714B is connected for common rotation with a third shaft or interconnecting member 38. The planet gear carrier 714C is connected for common rotation with the output shaft or member 20. The first set of planet gears 714E is a set of long planets configured to intermesh with each of the second sun gear member 714D and the second set of planet gears 714F. The second set of planet gears 714F is a set of short planet gears that are each configured to intermesh with each of the first sun gear member 714A, the ring gear member 714B, and the first set of planet gears 714E.

A second planetary gear set assembly 16 is a third planetary gear set 16 having a sun gear member 16A, a ring gear member 16C, and a planet gear carrier member 16B that rotatably supports a set of planetary gears 16D (only one of each is shown). The sun gear member 16A is connected for common rotation with a fourth shaft or interconnecting member 40. The ring gear member 16C is connected for common rotation with a fifth shaft or interconnecting member 42. The planet carrier member 16B is connected for common rotation with the second shaft or interconnecting member 36. The planet gears 16D are each configured to intermesh with both the sun gear member 16A and the ring gear member 16C.

A third planetary gear set assembly 18 is a fourth planetary gear set 18 having a sun gear member 18C, a ring gear member 18A and a planet gear carrier member 18B that rotatably supports a set of planet gears 18D. The sun gear ember 18C is connected for common rotation with the fourth shaft or interconnecting member 40. The ring gear member 18A is connected for common rotation with a sixth shaft or interconnecting member 44. The planet carrier member 18B is connected for common rotation with the input shaft or member 12. The planet gears 18D are each configured to intermesh with both the sun gear member 18C and the ring gear member 18A.

The input shaft or member 12 is continuously connected to an input source, such as an engine (nor shown) or a turbine of a torque converter (not shown). The output shaft or member 20 is continuously connected with another output such as the final drive unit or transfer case (not shown).

The torque-transmitting mechanisms, including a first, second, and third brakes 22, 24, 26 and a first, second, and third clutches 28, 30, 32 allow for selective interconnection of the shafts or interconnecting members 34, 36, 38, 40, 42, 44 to other shafts or interconnecting members 34, 36, 38, 40, 42, 44 the members of the planetary gear set assemblies 214, 16, 18, or the stationary member or transmission housing 50.

For example, the first brake 22 is selectively engageable to connect the third shaft or interconnecting member 38 to the transmission housing 50 in order to restrict the ring gear member 714B from rotating relative to the transmission housing 50. The second brake 24 is selectively engageable to connect the fifth shaft or interconnecting member 42 to the transmission housing 50 in order to restrict the ring gear member 16C from rotating relative to the transmission housing 50. The third brake 26 is selectively engageable to connect the fourth shaft or interconnecting member 40 to the transmission housing 50 in order to restrict the sun gear member 16A from rotating relative to the transmission housing 50. The first clutch 28 is selectively engageable to connect the first shaft or interconnecting member 34 with the input shaft or member 12. The second clutch 30 is selectively engageable to connect the first shaft or interconnecting member 34 with the sixth shaft or interconnecting member 44. The third clutch 32 is selectively engageable to connect the second shaft or interconnecting member 36 with the sixth shaft or interconnecting member 44. In turn, the components of the planetary gear sets connected to each of the connecting members are also connected or restricted accordingly.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, and third planetary gear sets each having at least a first, second, and third members, and wherein the first planetary gear set further includes a fourth member;
two interconnecting members each continuously interconnecting one of the first, second, and third members of the first, second, and third planetary gear sets with another one of the first, second, and third members of the first, second, and third planetary gear sets; and
six torque transmitting mechanisms each selectively engageable to interconnect one of the first, second, and third members of the first, second, and third planetary gear sets with another one of the first, second, and third members of another of the first, second, and third planetary gear sets or a stationary member, and
wherein the six torque transmitting mechanisms are selectively engageable in combinations of at least three to establish a plurality of forward speed ratios and at least one reverse speed ratio between the input member and the output member, a first of the six torque transmitting mechanisms is selectively engageable to interconnect the first member of the first planetary gear set with the first member of the third planetary gear set, and a second of the six torque transmitting mechanisms is selectively engageable to interconnect the first member of the first planetary gear set with the second member of the third planetary gear set.

2. The transmission of claim 1 wherein a first of the two interconnecting members continuously interconnects the fourth member of the first planetary gear set with the second member of the second planetary gear set.

3. The transmission of claim 2 wherein a second of the two interconnecting members continuously interconnects the first member of the second planetary gear set with the third member of the third planetary gear set.

4. The transmission of claim 1 wherein a third of the six torque transmitting mechanisms is selectively engageable to interconnect the fourth member of the first planetary gear set with the first member of the third planetary gear set.

5. The transmission of claim 4 wherein a fourth of the six torque transmitting mechanisms is selectively engageable to interconnect the third member of the first planetary gear set with the stationary member.

6. The transmission of claim 5 wherein a fifth of the six torque transmitting mechanisms is selectively engageable to interconnect the third member of the second planetary gear set with the stationary member.

7. The transmission of claim 6 wherein a sixth of the six torque transmitting mechanisms is selectively engageable to interconnect the third member of the third planetary gear set with the stationary member.

8. The transmission of claim 1 wherein the input member is continuously connected for common rotation with the second member of the third planetary gear set.

9. The transmission of claim 8 wherein the output member is continuously connected for common rotation with the second member of the first planetary gear set.

10. The transmission of claim 1 wherein the first member of the first planetary gear set, the first member of the second planetary gear set, and the third member of the third planetary gear set are first sun gears, the third member of the second planetary gear set and the first member of the third planetary gear set are ring gears, and the second member of the second planetary gear set and the second member of the third planetary gear set are planet carriers.

11. The transmission of claim 10 wherein the second member of the first planetary gear set is a ring gear, the third member of the first planetary gear set is a planet carrier, and the fourth member of the first planetary gear set is a combined sun/ring gear.

12. The transmission of claim 10 wherein the second and third members of the first planetary gear set include a ring gear combined with a planet carrier and the fourth member of the first planetary gear set is a second sun gear.

13. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the second sun gear, the ring gear, and the second set of pinions, and the second set of pinions are short pinions meshing with the first set of pinions and the first sun gear.

14. The transmission of claim 10 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the second sun gear, the small diameter portion meshing with the ring gear and the second set of pinions, and the second set of pinions are short pinions and mesh with the small diameter portion of the first set of pinions and the first sun gear.

15. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, the second set of pinions, and the ring gear, the second set of pinions are long pinions meshing with the first set of pinions and the first sun gear.

16. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, and the second set of pinions, and the second set of pinions are long pinions meshing with the first set of pinions, the first sun gear, and the ring gear.

17. The transmission of claim 10 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the first sun gear, the small diameter portion meshing with the ring gear and the second set of pinions, and the second set of pinions are short pinions meshing with the small diameter portion of the first set of pinions and the second sun gear.

18. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the first sun gear, the ring gear, and the second set of pinions, and the second set of pinions are long pinions meshing with the first set of pinions and the second sun gear.

19. A transmission comprising:
an input member;
an output member;
first, second, and third planetary gear sets each having at least a first, second, and third members, and wherein the first planetary gear set further includes a fourth member, the input member is continuously connected for common rotation with the second member of the third planetary gear set, and the output member is continuously connected for common rotation with the second member of the first planetary gear set;
a first interconnecting member continuously interconnecting the fourth member of the first planetary gear set with the second member of the second planetary gear set;
a second interconnecting member continuously interconnecting the first member of the second planetary gear set with the third member of the third planetary gear set; and
six torque transmitting mechanisms each selectively engageable to interconnect a member of the first, second, and third planetary gear sets with another member of the first, second, and third planetary gear sets or a stationary member, and
wherein the six torque transmitting mechanisms are selectively engageable in combinations of at least three to establish a plurality of forward speed ratios and at least one reverse speed ratio between the input member and the output member.

20. The transmission of claim 19 wherein a first of the six torque transmitting mechanisms is selectively engageable to interconnect the first member of the first planetary gear set with the first member of the third planetary gear set.

21. The transmission of claim 20 wherein a second of the six torque transmitting mechanisms is selectively engageable to interconnect the first member of the first planetary gear set with the second member of the third planetary gear set.

22. The transmission of claim 21 wherein a third of the six torque transmitting mechanisms is selectively engageable to interconnect the fourth member of the first planetary gear set with the first member of the third planetary gear set.

23. The transmission of claim 22 wherein a fourth of the six torque transmitting mechanisms is selectively engageable to interconnect the third member of the first planetary gear set with the stationary member.

24. The transmission of claim 23 wherein a fifth of the six torque transmitting mechanisms is selectively engageable to interconnect the third member of the second planetary gear set with the stationary member.

25. The transmission of claim 24 wherein a sixth of the six torque transmitting mechanisms is selectively engageable to interconnect the third member of the third planetary gear set with the stationary member.

26. The transmission of claim 19 wherein the first member of the first planetary gear set, the first member of the second planetary gear set, and the third member of the third planetary gear set are first sun gears, the third member of the second planetary gear set and the first member of the third planetary gear set are ring gears, and the second member of the second planetary gear set and the second member of the third planetary gear set are planet carriers.

27. The transmission of claim 26 wherein the second member of the first planetary gear set is a ring gear, the third member of the first planetary gear set is a planet carrier, and the fourth member of the first planetary gear set is a combined sun/ring gear.

28. The transmission of claim 26 wherein the second and third members of the first planetary gear set include a ring gear combined with a planet carrier and the fourth member of the first planetary gear set is a second sun gear.

29. The transmission of claim 26 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the second sun gear, the ring gear, and the second set of pinions, and the second set of pinions are short pinions meshing with the first set of pinions and the first sun gear.

30. The transmission of claim 26 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the second sun gear, the small diameter portion meshing with the ring gear and the second set of pinions, and the second set of pinions are short pinions and mesh with the small diameter portion of the first set of pinions and the first sun gear.

31. The transmission of claim 26 wherein the second member of the first planetary gear set is a ring gear, the third member of the first planetary gear set is a planet carrier, fourth member of the first planetary gear set is a second sun gear, and the first planetary gear set includes a first and a second set of pinions rotatably supported by the planet carrier, the first set of pinions are short pinions meshing with the second sun gear, the second set of pinions, and the ring gear, the second set of pinions are long pinions meshing with the first set of pinions and the first sun gear.

32. The transmission of claim 26 wherein the second member of the first planetary gear set is a ring gear, the third member of the first planetary gear set is a planet carrier, fourth member of the first planetary gear set is a second sun gear, and the first planetary gear set includes a first and a second set of pinions rotatably supported by the planet carrier, the first set of pinions are short pinions meshing with the second sun gear, and the second set of pinions, and the second set of pinions are long pinions meshing with the first set of pinions, the first sun gear, and the ring gear.

33. The transmission of claim 26 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the first sun gear, the small diameter portion meshing with the ring gear and the second set of pinions, and the second set of pinions are short pinions meshing with the small diameter portion of the first set of pinions and the second sun gear.

34. The transmission of claim 26 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the first sun gear, the ring gear, and the second set of pinions, and the second set of pinions are long pinions meshing with the first set of pinions and the second sun gear.

35. A transmission comprising:
an input member;
an output member;
first, second, and third planetary gear sets each having at least a first, second, and third members, and wherein the first planetary gear set further includes a fourth member, the input member is continuously connected for common rotation with the second member of the third planetary gear set, and the output member is continuously connected for common rotation with the second member of the first planetary gear set;
two interconnecting members continuously interconnecting a member of the first, second, and third planetary gear sets with another member of the first, second, and third planetary gear sets; and
a first torque transmitting mechanism is selectively engageable to interconnect the first member of the first planetary gear set with the first member of the third planetary gear set;
a second torque transmitting mechanism is selectively engageable to interconnect the first member of the first planetary gear set with the second member of the third planetary gear set;
a third torque transmitting mechanism is selectively engageable to interconnect the fourth member of the first planetary gear set with the first member of the third planetary gear set;
a fourth torque transmitting mechanism is selectively engageable to interconnect the third member of the first planetary gear set with the stationary member;
a fifth torque transmitting mechanism is selectively engageable to interconnect the third member of the second planetary gear set with the stationary member; and
a sixth torque transmitting mechanism is selectively engageable to interconnect the third member of the third planetary gear set with the stationary member, and
wherein the six torque transmitting mechanisms are selectively engageable in combinations of at least three to establish a plurality of forward speed ratios and at least one reverse speed ratio between the input member and the output member.

36. The transmission of claim 35 wherein a first of the two interconnecting members continuously interconnects the fourth member of the first planetary gear set with the second member of the second planetary gear set.

37. The transmission of claim 36 wherein a second of the two interconnecting members continuously interconnects the first member of the second planetary gear set with the third member of the third planetary gear set.

38. The transmission of claim 35 wherein the first member of the first planetary gear set, the first member of the second planetary gear set, and the third member of the third planetary gear set are first sun gears, the third member of the second planetary gear set and the first member of the third planetary gear set are ring gears, and the second member of the second planetary gear set and the second member of the third planetary gear set are planet carriers.

39. The transmission of claim 35 wherein the second member of the first planetary gear set is a ring gear, the third member of the first planetary gear set is a planet carrier, and the fourth member of the first planetary gear set is a combined sun/ring gear.

40. The transmission of claim 35 wherein the second and third members of the first planetary gear set include a ring gear combined with a planet carrier and the fourth member of the first planetary gear set is a second sun gear.

41. The transmission of claim 35 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the second sun gear, the ring gear, and the second set of pinions, and the second set of pinions are short pinions meshing with the first set of pinions and the first sun gear.

42. The transmission of claim 35 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the second sun gear, the small diameter portion meshing with the ring gear and the second set of pinions, and the second set of pinions are short pinions and mesh with the small diameter portion of the first set of pinions and the first sun gear.

43. The transmission of claim 35 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, the second set of pinions, and the ring gear, the second set of pinions are long pinions meshing with the first set of pinions and the first sun gear.

44. The transmission of claim 35 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the second sun gear, and the second set of pinions, and the second set of pinions are long pinions meshing with the first set of pinions, the first sun gear, and the ring gear.

45. The transmission of claim 35 wherein the third member of the first planetary gear set is a planet carrier, the second member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion meshing with the first sun gear, the small diameter portion meshing with the ring gear and the second set of pinions, and the second set of pinions are short pinions meshing with the small diameter portion of the first set of pinions and the second sun gear.

46. The transmission of claim 35 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions meshing with the first sun gear, the ring gear, and the second set of pinions, and the second set of pinions are long pinions meshing with the first set of pinions and the second sun gear.

* * * * *